(12) United States Patent
Johnson

(10) Patent No.: US 7,188,427 B2
(45) Date of Patent: Mar. 13, 2007

(54) MULTI-TASK PROTRACTOR

(76) Inventor: Marion Johnson, 737 S. R.L. Thornton Frwy, Dallas, TX (US) 75203

( * ) Notice: Subject to any disclaimer, the term of this patent is extended or adjusted under 35 U.S.C. 154(b) by 33 days.

(21) Appl. No.: 11/052,013

(22) Filed: Feb. 4, 2005

(65) Prior Publication Data
US 2006/0174503 A1    Aug. 10, 2006

(51) Int. Cl.
*B43L 7/10* (2006.01)
(52) U.S. Cl. .............. 33/471; 33/424; 33/465
(58) Field of Classification Search ......... 33/451–452, 33/471, 465, 424–425, 418, 495–497
See application file for complete search history.

(56) References Cited
U.S. PATENT DOCUMENTS

| 49,675 | A | | 8/1865 | Chase | |
|---|---|---|---|---|---|
| 363,988 | A | | 5/1887 | Carson | |
| 464,598 | A | | 12/1891 | Welton et al. | |
| 587,021 | A | * | 7/1897 | Templin | 33/452 |
| 729,347 | A | | 5/1903 | Hummel | |
| 1,007,269 | A | * | 10/1911 | Clarke | 33/451 |
| 1,083,376 | A | * | 1/1914 | Robinson | 33/451 |
| 1,128,673 | A | | 2/1915 | Foner | |
| 1,440,284 | A | | 12/1922 | Engstrom | |
| 1,797,827 | A | | 3/1931 | Heimrich | |
| 1,839,014 | A | * | 12/1931 | Guerre | 33/471 |
| 1,878,119 | A | * | 9/1932 | Dowd | 33/471 |
| 2,247,327 | A | | 6/1941 | Brady | |
| 2,549,950 | A | | 4/1951 | Walton | |
| 2,570,356 | A | | 10/1951 | Luis | |
| 2,640,268 | A | * | 6/1953 | Thompson | 33/451 |
| 2,878,569 | A | * | 3/1959 | Metrulis | 33/451 |
| 3,009,250 | A | | 11/1961 | Schock | |
| 3,522,657 | A | | 8/1970 | Metrulis | |
| 4,481,720 | A | | 11/1984 | Sury | |
| 4,611,407 | A | | 9/1986 | van Gorp | |
| 4,736,524 | A | | 4/1988 | King | |
| 4,745,689 | A | * | 5/1988 | Hiltz | 33/451 |
| 5,419,053 | A | | 5/1995 | Kathan | |
| 5,440,818 | A | * | 8/1995 | Mailhot | 33/452 |
| 5,586,395 | A | | 12/1996 | Malczewski | |
| 6,134,795 | A | | 10/2000 | Hitchcock | |
| 6,237,238 | B1 | | 5/2001 | Shapiro | |
| 6,314,652 | B1 | * | 11/2001 | English | 33/421 |
| D460,924 | S | | 7/2002 | Hitchcock | |
| D493,734 | S | | 8/2004 | Ellis | |
| 6,839,974 | B1 | * | 1/2005 | Hitchcock | 33/473 |
| 6,895,683 | B1 | * | 5/2005 | Olsen | 33/562 |
| 6,978,550 | B2 | * | 12/2005 | Xieh | 33/27.02 |

* cited by examiner

*Primary Examiner*—Yaritza Guadalupe-McCall
(74) *Attorney, Agent, or Firm*—F. Lindsey Scott

(57) ABSTRACT

A multi-task protractor apparatus having the capabilities of a rotating protractor, adjustable triangle, ruler, miniature leveler, framing square and roof angle finder is disclosed. The multi-task protractor accurately measures angles and slopes and provides two straight edges for constructing angles and triangles.

13 Claims, 7 Drawing Sheets

MULTI-TASK PROTRACTOR

FIELD OF THE INVENTION

This invention relates to a rotating protractor apparatus having the capabilities of a rotating protractor, adjustable triangle, ruler, miniature leveler, framing square and roof angle finder. The rotating protractor accurately measures angles and slopes and provides two straight edges for drawing lines.

BACKGROUND OF THE INVENTION

Architects, engineers, layout draftsmen, manufacturing engineering, field engineers, students and others require the use of protractors, triangle construction equipment, framing squares and the like almost daily in their activities. This results in the requirement to carry one or more rulers, a square, a protractor, a level, and the like. Since it is inconvenient to carry all of these tools a continuing effort has been directed to development of a single tool which can supply all of these functions.

SUMMARY OF THE INVENTION

According to the present invention, the above mentioned functions are all accomplished by the use of a multi-task protractor comprising: a ruler of a selected length, having a first edge and a second edge, a first side and a second side, a length and a width, a first connector opening, at least one second connector opening and at least one leveling vial; a rotatable arm having a first and a second end, a first and a second side, a first arm connector opening near the first end of the rotatable arm and a second arm connector opening and being connected to the ruler by a first connector connecting the first connector opening and the first arm connector opening for rotation about the first connector or positioning in selected fixed orientations relative to the ruler and the first connector; and, a protractor comprising a 180 degree arc having an arc inside and an arc outside, a first and a second end, a passageway extending around the 180 degree arc between the arc inside and the arc outside and at least one set of graduations on at least one side of the protractor, the protractor being connected to the ruler and to the rotatable arm by at least one of a second connector connecting at least one of the plurality of second connector openings, and the passageway and a third connector in the second arm connector opening to enable sliding and rotationable movement of the protractor relative to the rotatable arm and to enable positioning the protractor in selected fixed positions relative to the ruler and the rotatable arm.

DESCRIPTION OF PREFERRED EMBODIMENTS

In the discussion of the Figures, the same numbers will be used throughout to refer to the same or similar components.

Figure 1:
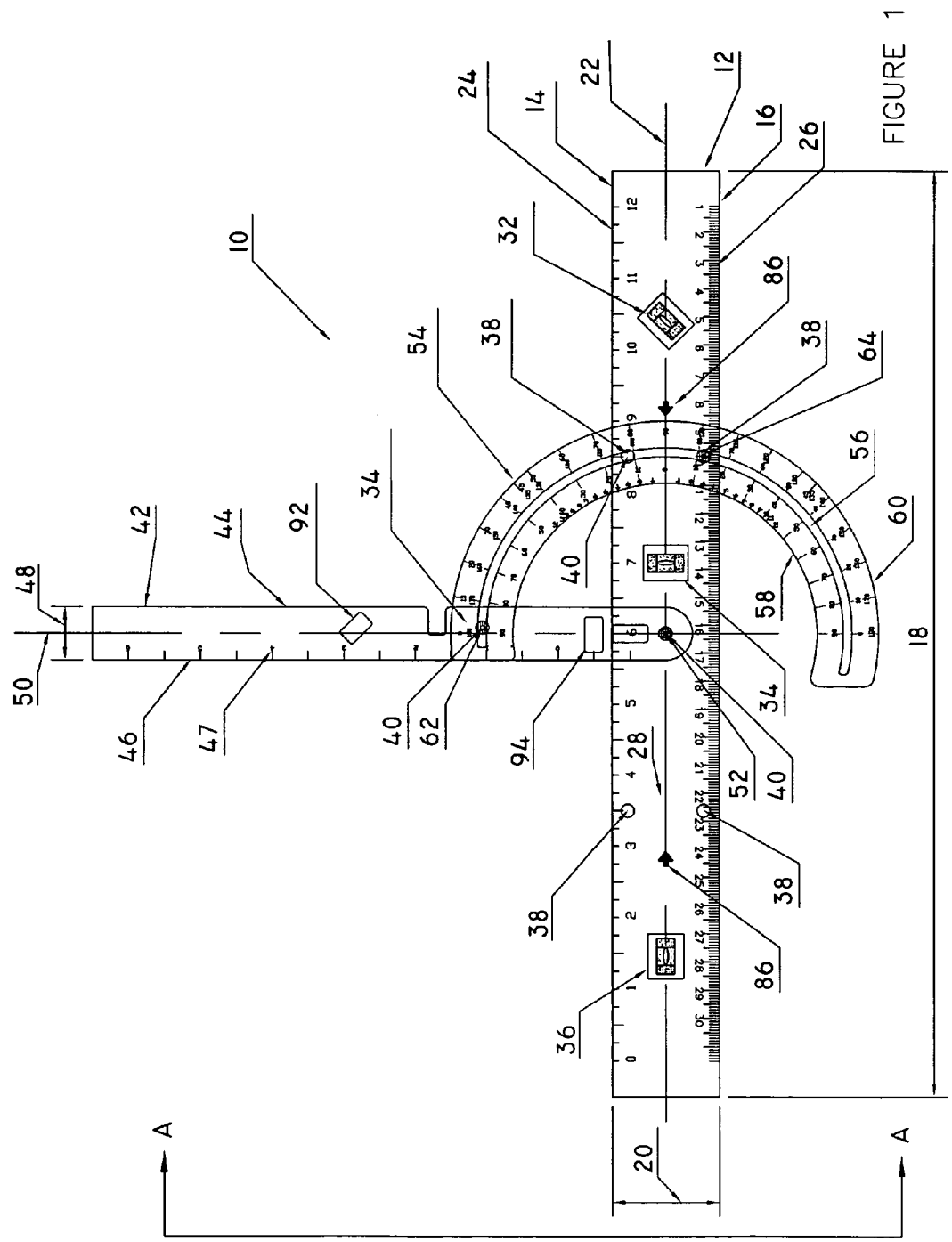
FIG. 1 is a schematic diagram of an embodiment of the multi-task protractor of the present invention.

In FIG. 1 an embodiment 10 of the multi-task protractor of the present invention is shown. The multi-task protractor comprises a ruler 12 having a first edge 14 and a second edge 16. The ruler also has a length 18, a width 20 and a longitudinal axis 22. English marking units 24 are shown positioned on first edge 14 of the ruler with metric marking units 26 being shown on second edge 16 of the ruler. Obviously a different choice of units or units in a different location could be used if desired. Ruler 12 has a first side 28 and a second side 30 and also includes leveling vials 32, 34 and 36. The leveling vials are positioned to enable the positioning of the ruler in an upright position, a horizontal position or a 45 degree angle position.

Ruler 12 also includes holes 38 to hold connectors used to maintain a protractor 54 in position relative to ruler 12. Holes 38 are positioned in ruler 12 at locations useful for positioning protractor 54 in a desired position. As shown in this embodiment, thumb screw nuts 40 with threaded bolts positioned through ruler 12 and a rotatable arm 42 are used to maintain rotatable arm 42, ruler 12 and protractor 54 in desired orientation to each other. Rotatable arm 42 includes a first side 44, a second side 46, a measurement scale 47, which may be of any suitable units, a width 48 and has a longitudinal axis 50. Rotatable arm 42 is held in position relative to ruler 12 by a first connector 52 which comprises a thumb screw nut operably positioned on a threaded bolt penetrating ruler 12. Clearly thumb screws or their equivalent are equally useful. Similarly, the threaded bolt could be positioned through ruler 12 or rigidly fixed in ruler 12 in openings 38 or the like. Such variations are well within the scope of the present invention.

Protractor 54 includes an arc inside 58, an arc outside 60 and a passageway 56 which allows it to move relative to a second connector 62 positioned in rotatable arm 42 and a third connector 64 positioned in ruler 12. As mentioned previously, these connectors are shown as threaded bolt fittings which are equipped with a thumb screw nut on each threaded bolt. When these thumbscrews are tightened, the protractor, rotary arm and ruler are locked in position. In this position, the rotary arm and ruler may function as a square or a level. Ruler 12 can function as a level with rotatable arm 42 in virtually any position so long as the position of rotatable arm 42 does not interfere with the leveling measurement. Protractor 54 further includes a passageway 56, which enables sliding engagement with second and third connectors 62 and 64, respectively.

Ruler 12 also includes a pair of arrows 86 which are useful to read selected angles on protractor 54. These arrows may be etched, stamped or otherwise formed on ruler 12.

Ruler 12 may be of any suitable material, such as wood, plastic, steel or wood covered with plastic, steel or other metallic sheathing and the like. Any material which provides suitable strength and stability can be used. Rotatable arm 42 can be formed of a similar material. Desirably protractor 54 may be formed of steel or other metallic material, plastic or the like. The scaling units on protractor 54 may be etched, stamped or otherwise formed on protractor 54.

Figure 2:
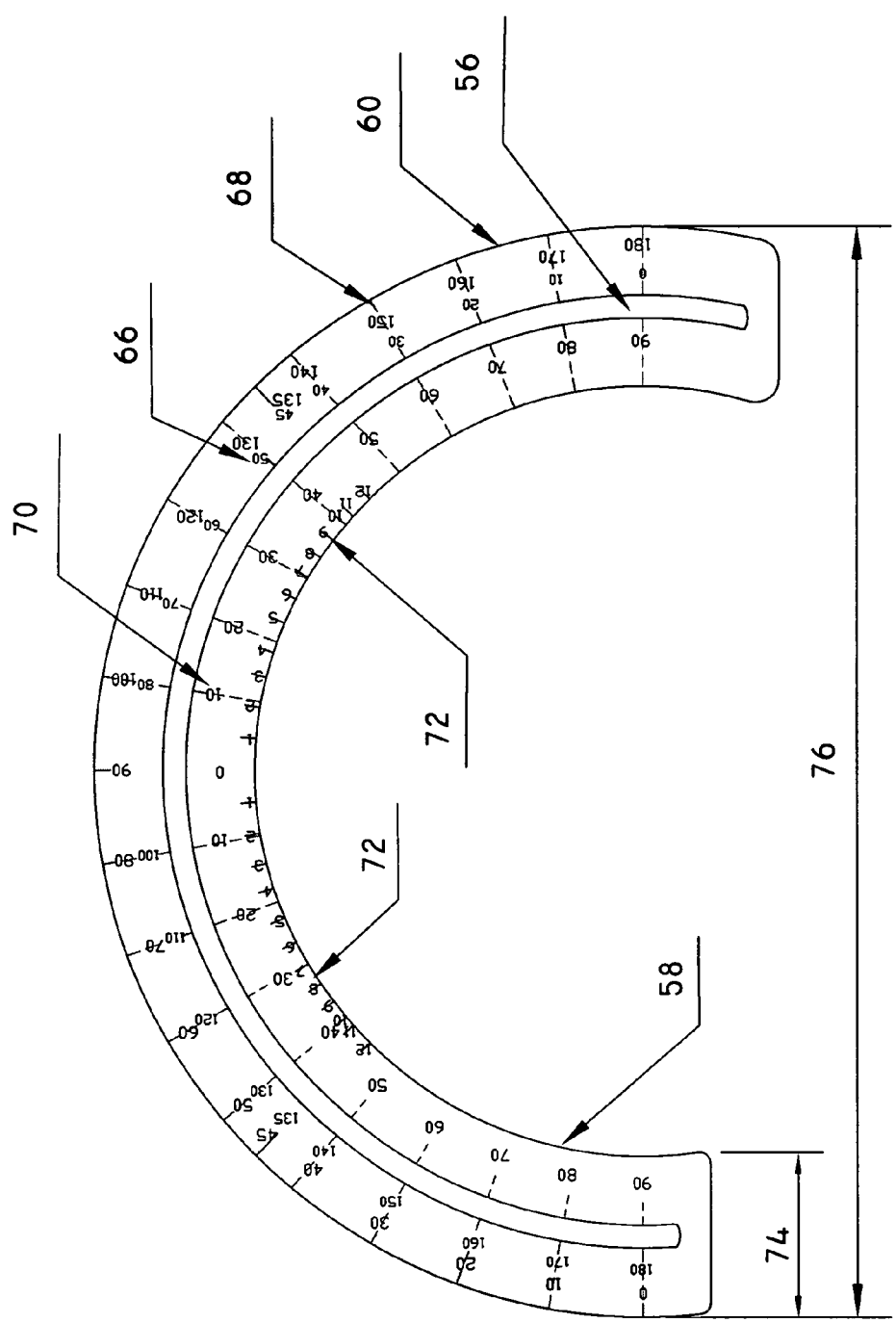
FIG. 2 is a larger scale view of the protractor shown in FIG. 1.

As shown in FIG. 2, protractor 54 in one embodiment includes a 0 to 180 degree scale 66 near arc outside 60 with 0 degrees at the left and a 180 to 0 degrees scale 68 with the 180 degrees at the left. In FIG. 2, protractor 54 also includes a 90 to 0 degrees scale 70 near passageway 56 with the 0 degrees being at the top of the arc. Further protractor 54 desirably includes a pitch scale 72 near arc inside 58, which is useful in determining the slope of roofs and the like. As shown, protractor 54 has a width 74 and a diameter 76.

Figure 3:
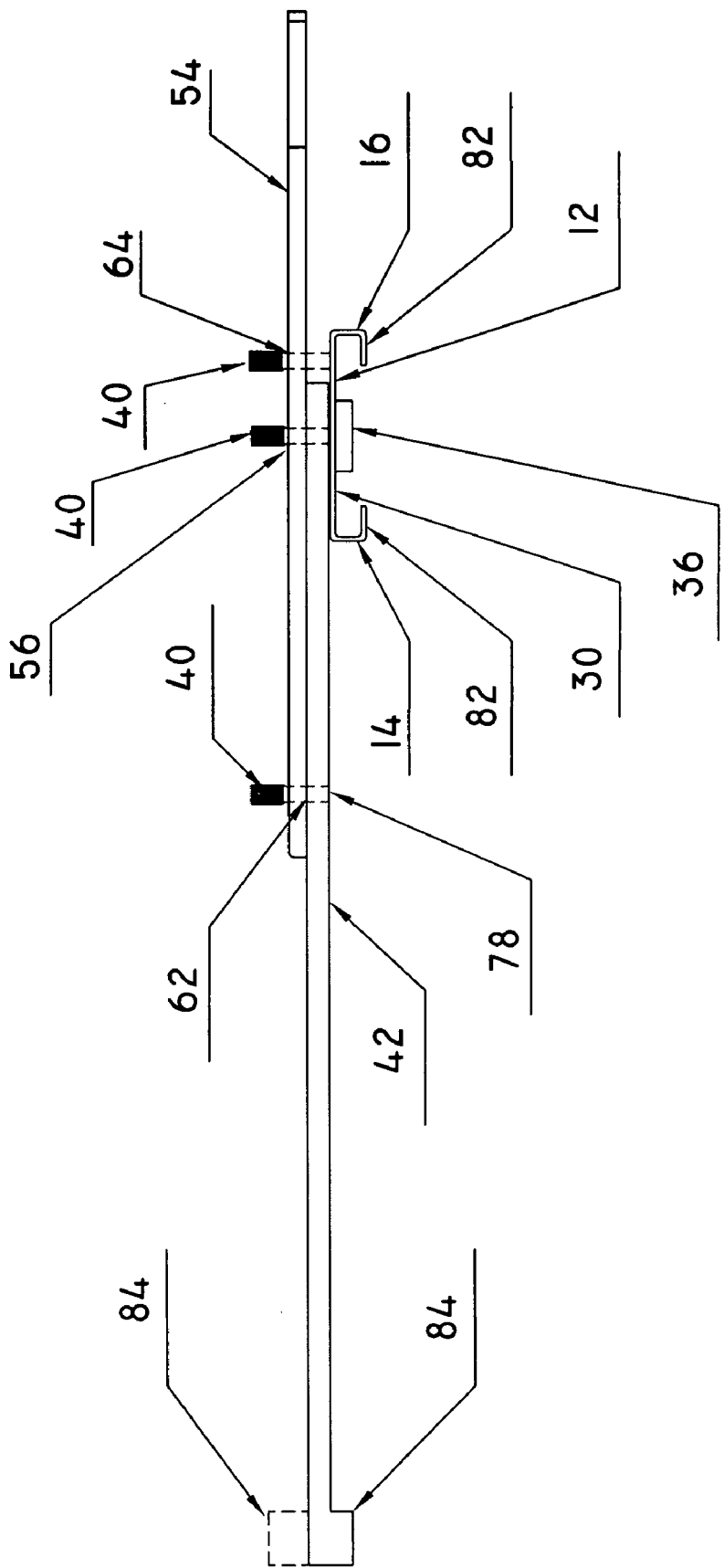
FIG. 3 is an end view taken at line AA of FIG. 1 of the multi-task protractor.

In FIG. 3, an end view of the multi-task protractor of FIG. 1 is shown. Thumbscrew nuts 40 forming first connector 52 and third connector 64 are shown. Connector 64 comprises a bolt which is amenable to tightening so that thumbscrew 40 can be tightened to maintain protractor 54 in a desired position relative to rotatable arm 42 and ruler 12.

Ruler 12 may be a formed piece of metal having lips 82 at edges 14 and 16. Connector 62 is shown having a head 78 which is flush with the back of rotatable arm 42. Rotatable arm 82 also includes a support 84 positioned on its back side which enables it to be supported at the same level on its outer end as on ruler 12. A second support 84' may also be provided if desired as shown by dotted lines.

Figure 4:
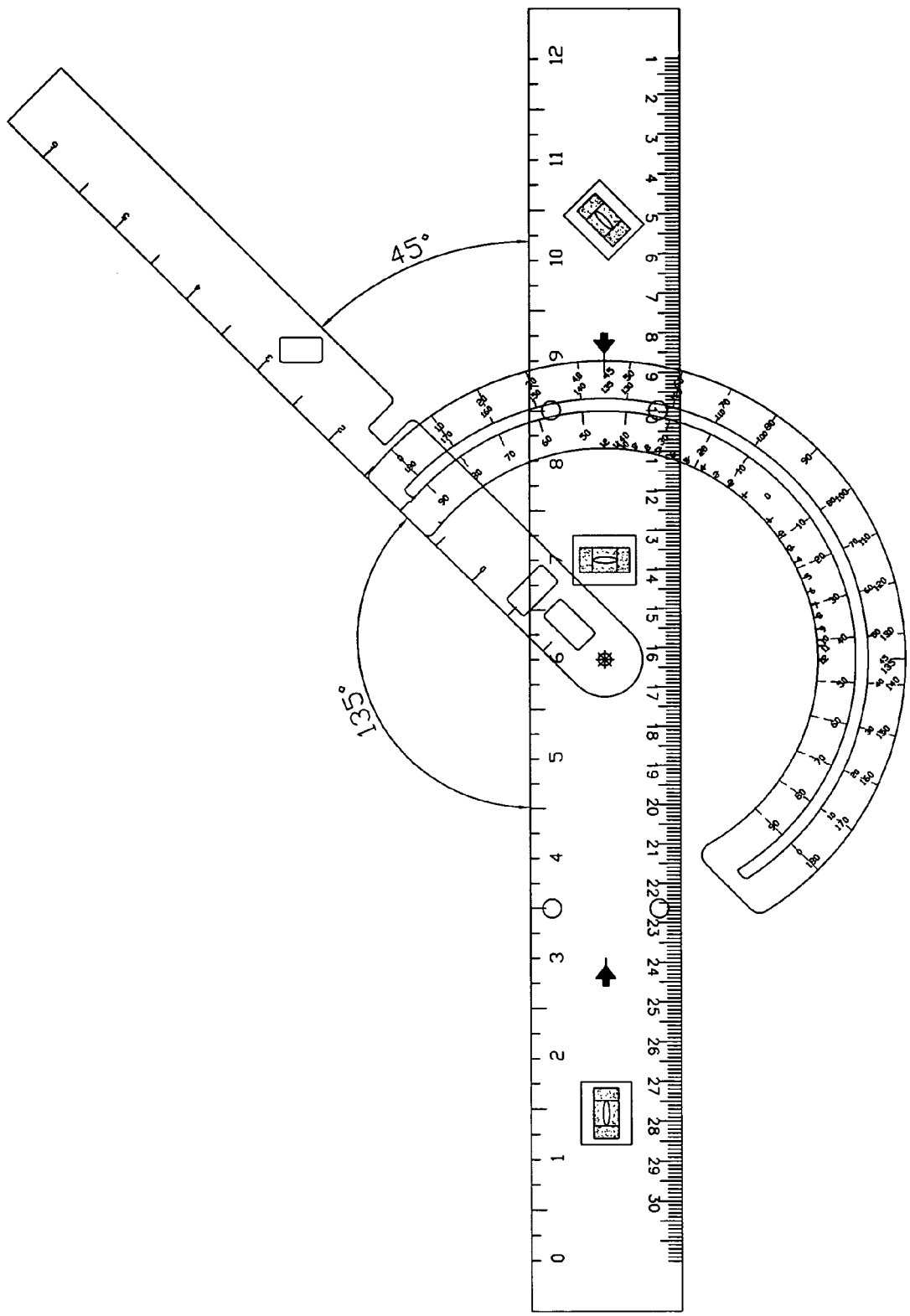
FIG. 4 is a schematic diagram of an embodiment of the multi-task protractor positioned to construct a triangle having a 45 degree angle.

In FIG. 4, the multi-task protractor is shown in position to construct triangles of a given configuration. In the embodiments shown, by positioning a line along the edge of first side 44 of adjustable arm 42 and along the edge 14 of ruler 12, a 45 degree angle is readily constructed. The multi-task protractor may then be removed and the ruler or the rotatable arm used to extend the two lines toward their junction and to extend the lines a desired distance from the junction so that the ends of the lines when joined by a third line between their ends form a triangle.

Figure 5:
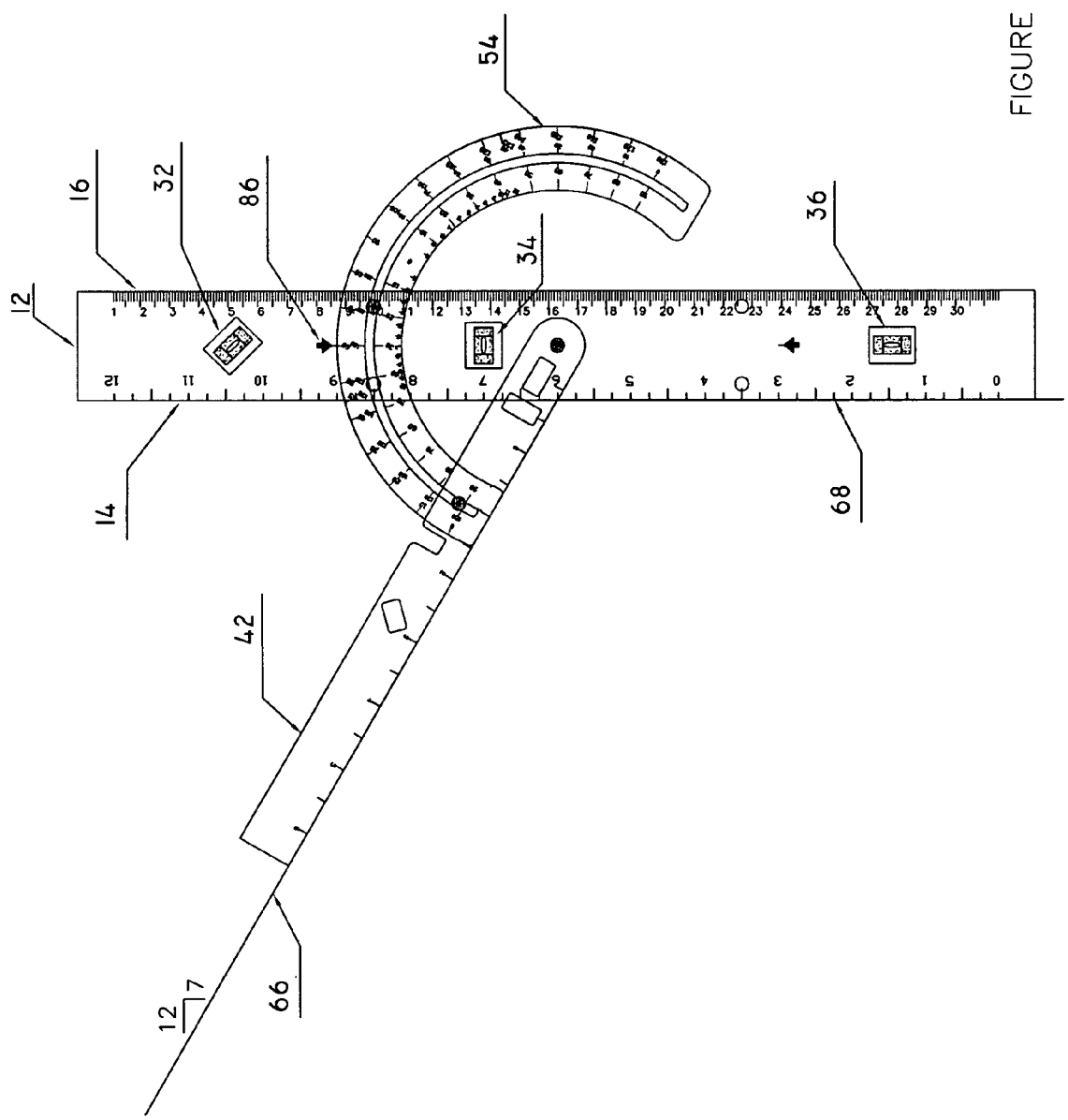
FIG. 5 is a schematic diagram of an embodiment of the multi-task protractor of the present invention positioned to measure the slope of a roof relative to a wall joining the roof.

In FIG. 5, the multi-task protractor is shown positioned against a wall 68 to determine the slope of a roof 66. The slope of the roof is read on scale 72 at arrow 86 and identifies to the user the slope of a roof 66. While performing this measurement, it is also possible to confirm that the horizontal wall 90 is in fact horizontal with the appropriate vial.

Figure 6:
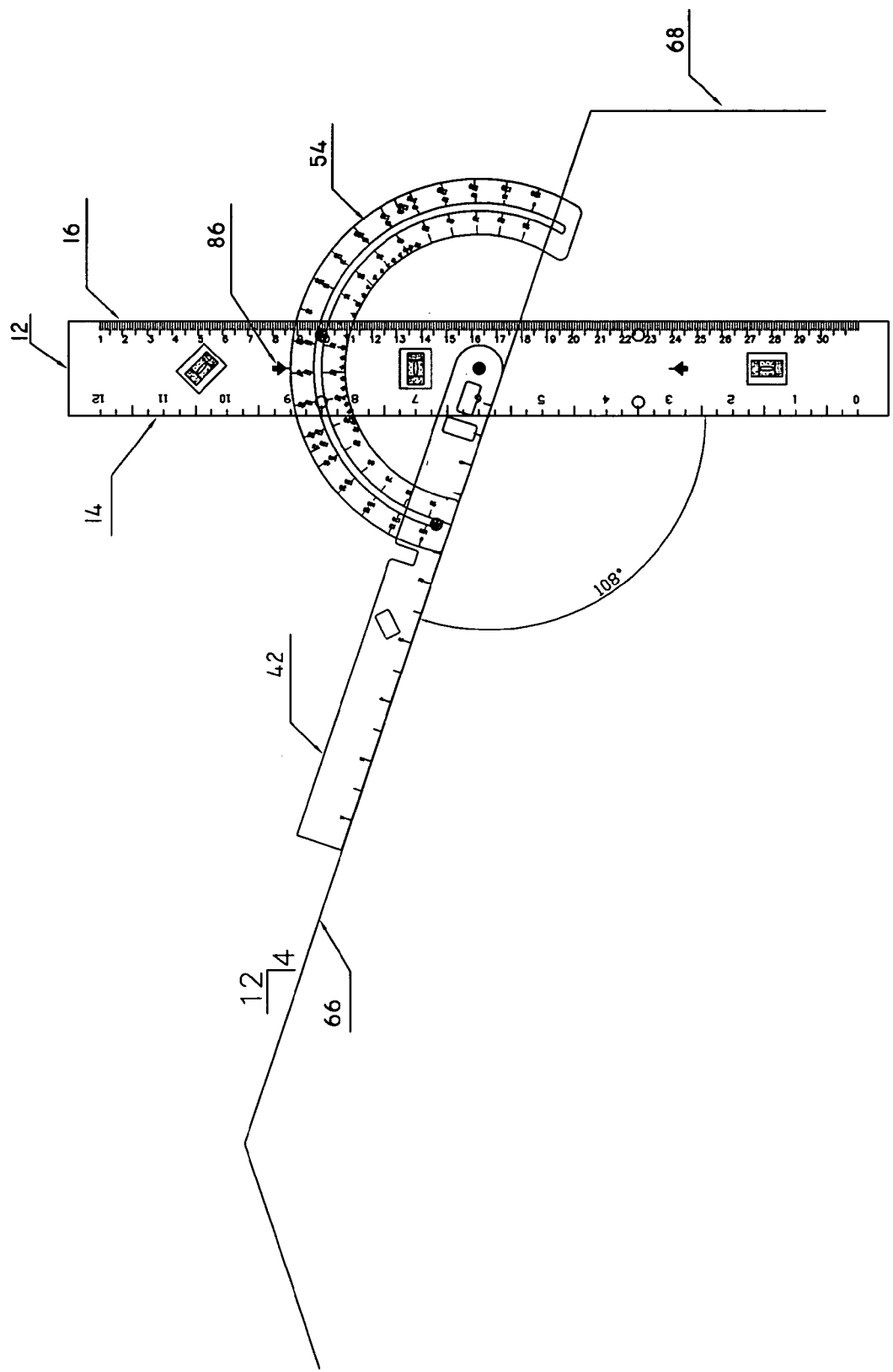
FIG. 6 is a schematic diagram of an embodiment of the multi-task protractor of the present invention positioned to measure the slope of a roof; and, FIG. 7 is a schematic diagram of an embodiment of the multi-task protractor of the present invention in its collapsed position so that its rotatable arm is positioned on the ruler.

In the embodiment shown in FIG. 6, the multi-task protractor is used to take a measurement of the slope of a roof at an edge of the roof or the like. The angle of the roof is the same as the angle between the arrow 86 and the 0 degree measurement at the top of the protractor. Further, the slope of the roof is readily determined by reading the protractor at arrow 86.

Figure 7:
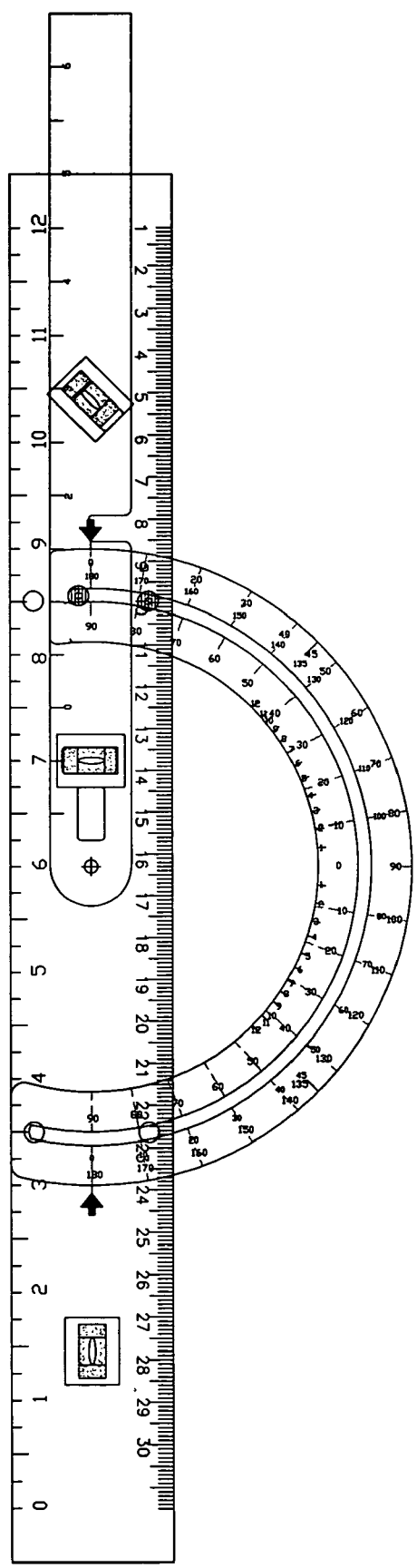

In FIG. 7, the rotary arm is shown in position over the top of ruler 12. In this embodiment, openings 92 and 94 respectively permit the positioning of rotary arm 42 flat over ruler 12.

In the use of the multi-task protractor, the embodiment shown in FIG. 1 enables the measurement of angles. The embodiment shown in FIG. 4 is desirable for constructing triangles or measuring angles. In all embodiments the ruler can function as a ruler. The levels permit the use of the multi-task protractor as a level. The embodiment shown in FIG. 1 can serve as a square and the embodiment shown in FIGS. 5 and 6 enable the determination of the slope of a roof easily and quickly.

As indicated previously, the rotating arm, the ruler and the protractor may be of any suitable material. Suitable materials may comprise wood, plastic, metal or combinations thereof. For instance, the protractor may comprise a metallic protractor with the scaling units etched on the protractor at the selected spots. The ruler and rotating arm may also be metallic or may be plastic or wood or plastic or metal-covered wood or the like. Any suitable material may be used provided it has the requisite strength and durability for use in the applications referred to herein.

Typically the ruler will be a 12 inch ruler with scaling in English and metric units. In this ruler base, there are typically three leveling vials. Desirably the rotating arm may be 8 inches long with a 6 inch measurement scale. The rotating arm is desirably attached to the base ruler by a brass knob or a thumbscrew connector. The rotating protractor will be attached to the ruler and the rotating arm with similar thumbscrew connectors. The ruler, protractor and rotating arm may have different or additional scaling units scribed on them as an alternative to those described above.

The multi-task protractor is a valuable combination of a protractor, adjustable triangle, ruler, level and framing square capable of determining or drawing certain measures, angles, slopes and the like.

This invention is useful to many technical professions, such as students, architects, engineers, draftsmen, estimators, artists and the like. It may also be used as a hand tool in the construction industry where carpenters, framers, metal sheet workers, roofers, etc. may use this tool to determine existing slopes and angles more efficiently than possible with any other tool. Further the use of the multi-task protractor enables the carrying of only a single tool for all these functions.

In many instances it may be desirable to provide a tool which also will provide a reciprocal angle. Particularly with reference to FIG. 6, please note that the angle θ is the same as the angle between arrow 86 and the top 0 degree point on protractor 54. This reciprocal angle is desirable in many instances. If cuts are being made in rafters to form roof 66, it is very desirable to know the θ angle.

This tool effectively combines six tools into one. The multi-task protractor combines a ruler, protractor, leveler, adjustable triangle, framing square and a roof angle finder.

For instance, the multi-task protractor may be used to give the user four measurements in one-step instead of only the two measurements achieved by the prior art. For instance, with respect to FIG. 6, the outside angle of 120 degrees can be read on the scale 66, the reciprocal angle can be read on scale 68, the adjacent angle can be read on scale 70 and the slope or pitch can be read on scale 72.

The multi-task protractor has an adjustable triangle and the protractor can be used to construct or measure any angle from 0 to 180 degrees. To measure the angle, the rotating arm should be adjusted to the desired degree marked by the arrow indicated in the middle center of the ruler base. The outside measurement is the angle. The second measurement reads the reciprocal angle and the third measure determines the adjacent angle. The multi-task protractor can measure any hip, ridge and valley rafter cut in one step and in several ways as discussed above.

As demonstrated above, the multi-task protractor is an extremely efficient and effective tool useful for those in the construction industry and by others who have need of rulers, protractors and the like for construction of angles, measurement of slopes and the like.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A multi-task protractor comprising:
   a) a ruler of a selected length, having a first edge and a second edge, a first side and a second side, a length and a width, a first connector opening, at least one second connector opening and at least one leveling vial;
   b) a rotatable arm having a first and a second end, a first and a second side, a first arm connector opening near the first end of the rotatable arm and a second arm connector opening and being connected to the ruler by a first connector connecting the first connector opening and the first arm connector opening for rotation about the first connector or positioning in selected fixed orientations relative to the ruler and the first connector wherein the rotatable arm includes at least one opening positioned and configured to be positioned over at least one vial when the rotatable arm is positioned over the first side of the ruler; and;
   c) a protractor comprising a 180 degree arc having an arc inside and an arc outside, a first and a second end, a passageway extending around the 180 degree arc between the arc inside and the arc outside and at least one set of graduations on at least one side of the protractor, the protractor being connected to the ruler and to the rotatable arm by at least one of a second connector connecting at least one of the plurality of second connector openings, and the passageway and a third connector in the second arm connector opening to enable sliding and rotationable movement of the protractor relative to the rotatable arm and to enable positioning the protractor in selected fixed positions relative to the ruler and the rotatable arm.

2. The multi-task protractor of claim 1 wherein the ruler comprises wood, plastic, metal or combinations thereof.

3. The multi-task protractor of claim 1 wherein the ruler includes an English units length measurement scale on its first side near its first edge.

4. The multi-task protractor of claim 1 wherein the ruler includes a metric units length measurement scale on its first side near its second edge.

5. The multi-task protractor of claim 1 wherein the first connector opening is positioned near the middle of the axial length of the ruler.

6. The multi-task protractor of claim 1 wherein the ruler includes three leveling vials.

7. The multi-task protractor of claim 1 wherein the rotatable arm includes a support projection on its second side near its second end.

8. The multi-task protractor of claim 1 wherein the protractor includes at least one of a graduation from 0 degrees at is first end to 180 degrees at its second end, a graduation from 180 degrees at its first end to 0 degrees at its second end, a graduation from 90 degrees at its first end to 0 degrees at a middle of the protractor and to 90 degrees at its second end and a graduation of pitches.

9. The multi-task protractor of claim 1 wherein the protractor is of plastic or metal.

10. The multi-task protractor of claim 1 wherein the first connector is a threaded manually tightenable nut fitting engaging a threaded bolt fitting.

11. The multi-task protractor of claim 1 wherein the at least one of the second connectors are a threaded manually tightenable fitting engaging a threaded bolt fitting.

12. The multi-task protractor of claim 1 wherein the ruler and rotatable arm are positionable to have a common longitudinal axis.

13. The multi-task protractor of claim 1 wherein two second connectors connect two second connector openings and the passageway.

* * * * *